United States Patent
Black et al.

(10) Patent No.: US 7,564,818 B2
(45) Date of Patent: Jul. 21, 2009

(54) REVERSE LINK AUTOMATIC REPEAT REQUEST

(75) Inventors: Peter J. Black, San Diego, CA (US); Jun Ma, San Diego, CA (US); Eduardo Esteves, Sao Paulo (BR); Christopher Gerard Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1088 days.

(21) Appl. No.: 10/305,338

(22) Filed: Nov. 26, 2002

(65) Prior Publication Data

US 2004/0100927 A1 May 27, 2004

(51) Int. Cl.
*H04B 7/00* (2006.01)
*H04B 7/216* (2006.01)
*H04W 4/00* (2006.01)
(52) U.S. Cl. ............... 370/335; 370/310; 370/329
(58) Field of Classification Search ........... 370/310, 370/329, 335
See application file for complete search history.

(56) References Cited

U.S. PATENT DOCUMENTS

| | | | |
|---|---|---|---|
| 5,289,527 A | 2/1994 | Tiedeman, Jr. | |
| 5,638,412 A | 6/1997 | Tiedeman, Jr. | |
| 5,703,902 A * | 12/1997 | Ziv et al. ............ | 375/228 |
| 5,903,554 A | 5/1999 | Saints | |
| 5,933,462 A | 8/1999 | Viterbi | |
| 6,275,478 B1 | 8/2001 | Tiedeman, Jr. | |
| 6,335,922 B1 | 1/2002 | Tiedeman, Jr. | |
| 6,418,161 B1 | 7/2002 | Shiveley | |
| 6,523,091 B2 | 2/2003 | Tirumala et al. | |

(Continued)

FOREIGN PATENT DOCUMENTS

EP   779755   6/1997

(Continued)

OTHER PUBLICATIONS

Hui Zhao et al., "New Go-Back-N ARQ Protocols for Point-to-Multipoint Communications," IEICE Transactions on Communications, vol. E77-B, No. 8, Aug. 1, 1994, pp. 1013-1022.

(Continued)

*Primary Examiner*—Alexander Eisen
*Assistant Examiner*—Matthew W Genack
(74) *Attorney, Agent, or Firm*—Donald C. Kordich; Charles E. Eggers (57) ABSTRACT

An Access Network (AN) can send an acknowledge message (ACK) to an Access Terminal (AT) to indicate that the AN has successfully decoded the data received in the first set of slots of the first data packet. The AN can send a negative acknowledge message (NAK) to the AT to indicate that the AN has not successfully decoded the data received in the first set of slots of a first data packet. Based upon receipt of the NAK, the AT can resend the data by sending a second set of slots of the first data packet containing redundant data. Based upon receipt of the ACK, the AT can send a first set of slots of another packet. The AT can gate off for a predetermined period of time after sending the first set of slots of a first packet and before sending a next set of slots.

24 Claims, 4 Drawing Sheets

U.S. PATENT DOCUMENTS

| | | | |
|---|---|---|---|
| 6,574,211 | B2 | 6/2003 | Padovani |
| 6,711,144 | B1 | 3/2004 | Kim |
| 6,751,480 | B2 | 6/2004 | Kogiantis |
| 6,928,085 | B2 | 8/2005 | Haartson |
| 6,954,448 | B2 | 10/2005 | Farley et al. |
| 7,099,629 | B1 * | 8/2006 | Bender .................. 455/69 |
| 7,158,504 | B2 * | 1/2007 | Kadaba et al. ............. 370/348 |
| 7,177,660 | B2 | 2/2007 | Mousley |
| 7,230,931 | B2 | 6/2007 | Struhsaker |
| 7,353,039 | B2 | 4/2008 | Czaja |
| 2001/0043572 | A1 | 11/2001 | Bilgic et al. |
| 2002/0035681 | A1 | 3/2002 | Maturana |
| 2003/0193906 | A1 | 10/2003 | Andrews |
| 2006/0101144 | A1 | 5/2006 | Wiryaman et al. |

FOREIGN PATENT DOCUMENTS

| | | |
|---|---|---|
| WO | 9610320 | 4/1996 |
| WO | 99/23844 | 5/1999 |

OTHER PUBLICATIONS

Lin, Shu, Automatic-Repeat-Request Error-Control Schemes, Dec. 1984—vol. 22, No. 12, p. 5-17, IEEE Communications Magazine, Piscataway, New Jersey, XP 000674086.

ISR-EP1559234-Aug. 3, 2005.

ISR-WO04038991-May 6, 2004.

TIA/EIA/IS-95 "Mobile Station-Base Station Compatibility Standard for Dual-Mode Wideband Spread Spectrum Cellular System," Jul. 1993.

TIA/EIA/IS-856 "cdma2000 High Rate Packet Data Air Interface Specification" Nov. 2000.

International Search Report—PCT/US03/034516—International Search Authority—European Patent Office Jun. 15, 2004.

International Preliminary Examination Report—PCT/US03/034516—IPEA/US—Sep. 17, 2007.

* cited by examiner

REVERSE LINK AUTOMATIC REPEAT REQUEST

BACKGROUND

1. Field

The present invention relates generally to wireless communications, and more specifically to sending data in a wireless communication system.

2. Background

The cdma2000 High Rate Packet Data Air Interface Specification published as TIA/EIA/IS-856, and more specifically the QUALCOMM CDMA2000 1xEV-DO version, is an air interface optimized for the delivery of high-speed wireless data to mobile and fixed terminals.

In 1xEV-DO, an access terminal (AT) is a device with a radio modem and a data interface that allows the, user to access a packet data network through the 1xEV-DO access network. An AT is analogous to a Mobile Station in IS-41 cellular network.

An Access Network (AN) is network equipment providing data connectivity between a packet-switched data network, for example, the Internet, and the ATs. As referred to herein, the AN can comprise a modem pool transceiver alone, and, additionally, other network equipment, for example, a modem pool controller.

The forward link (FL) refers to communications from the AN to the AT. Correspondingly, the reverse link (RL) refers to communications from the AT to the AN.

Multiple ATs can be communicating within a sector covered by a single BTS. The AN is limited by a received threshold power. The received power is a function of the number of ATs in the sector and the data rate of each AT in the sector. An AT transmitting at high data rate transmits signals at a higher power than an AT transmitting at a low data rate. When an AN approaches its received threshold power, the AN can send a message on the reverse link activity channel to all ATs in the AN's sector to reduce transmit rate. The transmitted signals of an AT can cause channel interference for a particular AT. Multiple ATs transmitting signals can cause even greater channel interference for the particular AT.

A need therefore exists for a method and apparatus for reducing the channel interference in a sector serving multiple ATs.

BRIEF DESCRIPTION OF THE DRAWINGS

FIG. 2 illustrates a method of data transmission by the AT;

DETAILED DESCRIPTION

In a code division multiple access (CDMA) system that conforms to the "TIA/EIA/IS-95 Mobile Station-Base Station Compatibility Standard for Dual-Mode Wideband Spread Spectrum Cellular System," (IS-95) data packets can be retransmitted on the FL. A technique for FL transmission is described in U.S. Patent Application Number, "Method and Apparatus for High Rate Packet Data Transmission," Ser. No. 08/963,386, filed Nov. 3, 1997. For example, a data packet can comprise a predetermined number of data units, with each data unit identified by a sequence number. Upon incorrect reception of one or more data units by a mobile station, the mobile station can send a negative acknowledgment (NACK), on the RL ACK channel, indicating the sequence numbers of the missing data units for retransmission from the base station. The base station receives the NACK message and can retransmit the data units received in error.

No such acknowledgement or retransmission exists for data transmission in the RL in a CDMA system.

The transmission unit of the physical layer of 1x-EVDO is a physical layer packet. Data is contained in a physical layer packet. In the RL, physical layer packets are contained in frames. Frames can be of 26.66 milliseconds (ms) in duration. A frame can comprise of 16 slots, with each slot 1.66 ms in duration.

Data is modulated at varying data rates in the Reverse Traffic Channel. The data rates can be 9.6 kilobits per second (kbps), 19.2 kbps, 38.4 kbps, 76.8 kbps, and 153.6 kbps. At data rates less than 76.8 kbps, data can be repeated in a frame. For example, at 9.6 kbps, data can be sent in the first two slots of a frame, and the same data repeated 7 times in the next 14 slots of a 16-slot frame; at 19.2 kbps, the data can be sent in the first 4 slots of a frame, and then repeated 3 times in the next 12 slots of a 16-slot frame; at 38.4 kbps, the data can be sent in the first 8 slots of a frame, and then repeated once in the next 8 slots of a 16-slot frame. Although data is not repeated in a frame for a data rate of 76.8 kbps, redundancy is provided by encoding, such as Turbo encoding, as encoding provides redundancy for data at other data rates.

The repetition of data within in a frame, and the redundancy provided by encoding, can advantageously be used to reduce the transmission of redundant data by individual ATs. By reducing the amount of redundant data transmitted by an individual AT in a sector, the channel interference in a sector serving multiple ATs can be reduced.

For data rates less than 153.6 kbps, the 16-slot frame can be divided into 16/N sets of slots before transmission by the AT, where N can be 1, 2, 4, or 8. For example, when N equals 2, the AT can transmit the first half of the frame (8 slots) to the AN and hold the second half of the frame in a queue for possible re-transmission of the data depending upon the successful decoding of the data of the first half of the frame as received by the AN.

Automatic repeat request (ARQ) refers to a protocol in which the receiver asks the transmitter to resend data. Upon successful decoding of the first half of the frame, the AN can send an acknowledge message (ACK) to the AT to indicate that the AN has successfully decoded the data received in the first half of the frame. Upon unsuccessful decoding of the first half of the frame, the AN can send a negative acknowledge message (NAK) to the AT to indicate that the AN has not successfully decoded the data received in the first half of the frame.

ACK is a message transmitted to indicate that some data has been received correctly. Typically, if the sender does not receive the ACK message after some predetermined time, or receives a NAK, the original data will be sent again.

NAK is a message transmitted to indicate that some data has been received incorrectly, for example the data may have a checksum error. An alternative to sending a NAK is to use only ACK messages, in which case the non-receipt of an ACK after a certain time is counted as a NAK. As used herein, NAK refers to the receipt of a NAK message or the non-receipt of an ACK.

The ACK or NAK can be sent over a FL ACK channel. In 1xEV-DO, the FL ACK channel can be introduced as a new MAC subchannel. The existing FL Medium Access Control (MAC) channel of 1xEV-DO includes a subchannel referred to as a Reverse Link Power Control (RPC) channel. The RPC channel uses binary phase-shift keying (BPSK) modulation for sending an RPC bit that requests the ATs in the sector to increase or decrease their power. The FL ACK channel can use BPSK modulation on the phase orthogonal to the phase of the RPC channel.

Other techniques can be used to create the FL ACK channel. There currently are 64 MAC subchannels. Some of these subchannels can be used for the FL ACK channel. In this example, the modulation phase of the FL ACK channel do not have to be orthogonal to the RPC channels.

When the AT is in a soft handoff, the ACK bit can be transmitted from only a serving sector or from all sectors in the AT's Active Set.

Figure 1:
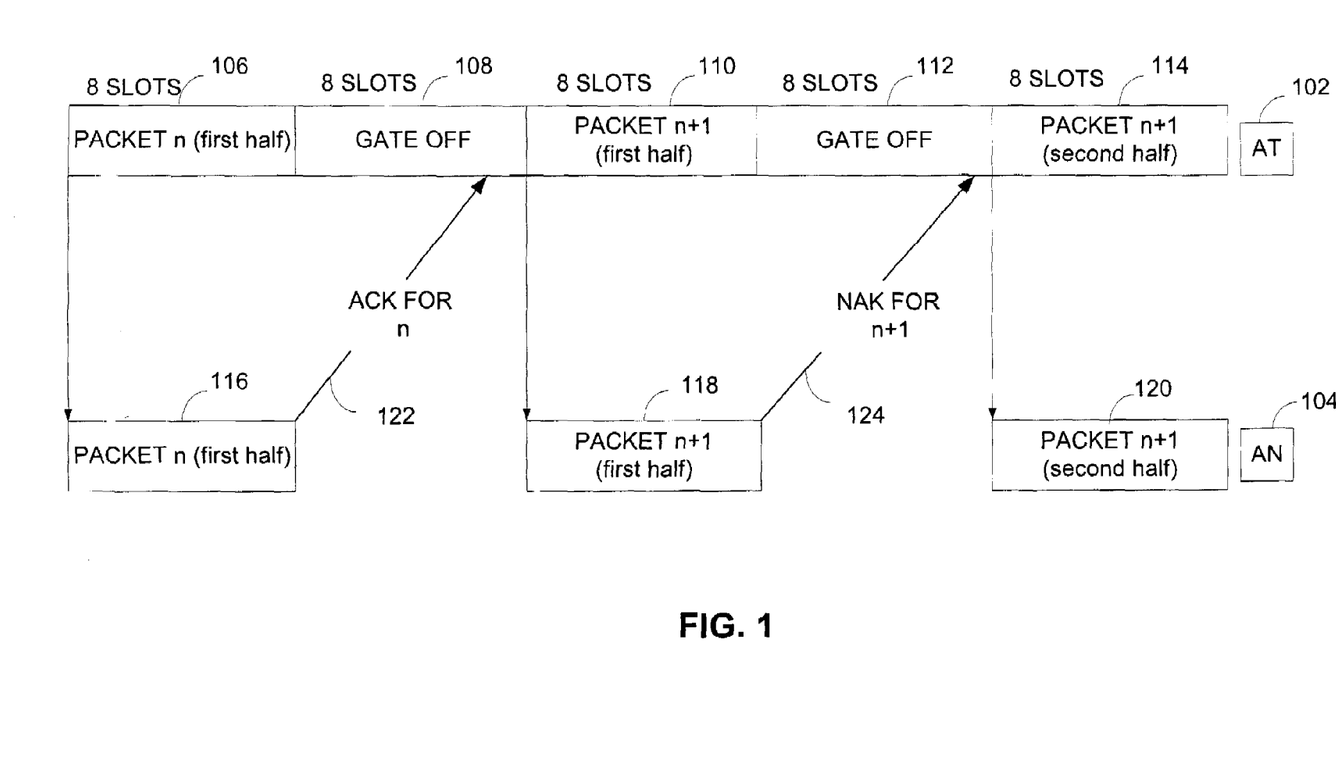
FIG. 1 illustrates the transmission of signals between an AT and an AN.

FIG. 1 illustrates the transmission of signals between an AT 102 and an AN 104 using an ARQ.

The AT sends a first set of slots 106 of packet n. In this example, the first set of slots comprises 8 slots. The first set of slots 116 of packet n are received by the AN. After the first set of slots 106 of packet n are sent by the AT, the AT gates off at 108 for a predetermined period of time after sending the first set of slots 106 of the first packet and before sending a next set of slots. In this example, the AT gates off for a duration of 8 slots.

Before sending the next set of slots, the AT receives an acknowledgement signal, ACK or NAK, from the AN, that indicates whether the first set of slots 116 of packet n has been successfully decoded or unsuccessfully decoded. The acknowledgement signal informs the AT whether to resend the data, for example, by sending a second set of slots of packet n containing redundant data, or to send new data, for example, a first set of slots from a packet n+1.

In this example, an ACK 122 is sent by the AN to indicate that the first set of slots 116 of packet n has been successfully decoded. The AT receives the ACK, indicating that the first set of slots 110 of packet n+1 can be sent by the AT. AT 102 sends the first set of slots 110 of packet n+1 and gates off at 112 for 8 slots. The AN receives the first set of slots 118 of packet n+1.

Before sending a next set of slots 114, the AT receives an acknowledgement signal, ACK or NAK, from the AN that indicates whether the first set of slots 118 of packet n+1 has been successfully decoded or unsuccessfully decoded. In this example, the AN sends a NAK 124. Based upon receipt of the NAK, the AT resends the data by sending a second set of slots 114 of packet n+1 containing redundant data. The AN receives the second set of slots 120 of packet n+1. The AN can combine the data contained in the first set of slots 118 of packet n+1 with the redundant data contained in the second set of slots 120 of packet n+1 and attempt to decode the data contained in the combined sets of slots. With the addition of the redundant data, the likelihood of successfully decoding the data is increased.

One of ordinary skill in the art will appreciate that the channel interference of the system can been reduced by gating off after transmission of data, and gating on after an acknowledgement signal has been received. In this example of two sets of 8 slots, the channel interference can potentially be halved.

Figure 2:
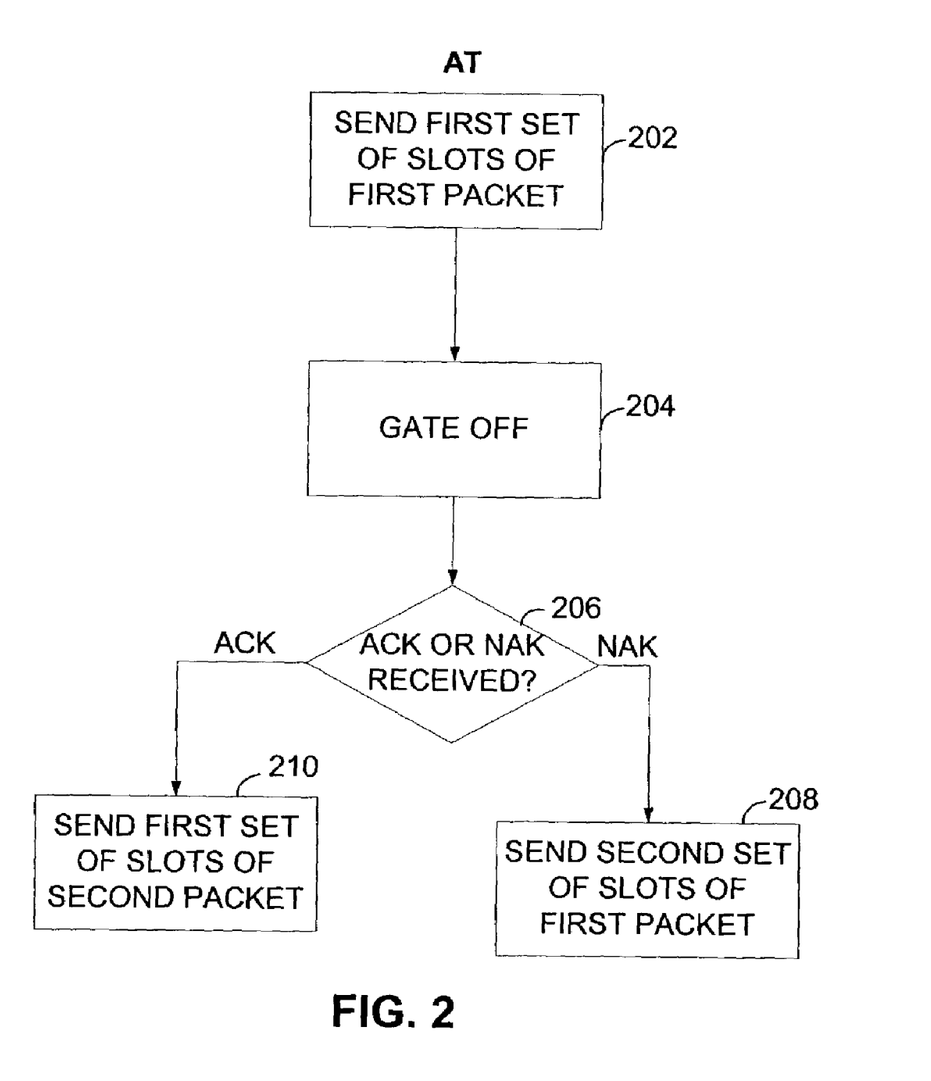

FIG. 2 illustrates a method of data transmission by the AT. At 202, the AT sends the first set of slots of a first packet to the AN. At 204, the AT gates off for a predetermined period of time before sending a next set of slots. One of ordinary skill in the art will appreciate that when the packet is divided into more than two sets of slots, for example, four sets of slots of four slots each, additional transmissions of first sets of packets can be performed before proceeding to 204.

At 206, the AT determines whether an ACK or a NAK from the AN has been received by the AT. In this example, the ACK indicates that the first set of slots of the first packet has been successfully decoded by the AN, and the NAK indicates that the first set of slots of the first packet has not been successfully decoded by the AN.

When the ACK has been received, the AT sends the first set of slots of a second packet at 210. When the NAK has been received, the AT sends a second set of slots of the first packet at 208.

The preceding example is for a packet that is divided into two sets of eight slots. One of ordinary skill in the art will appreciate that a packet can be divided into more than two halves.

For example, if the packet is divided into four sets of slots of four slots each, the AT can send a first set of slots of a first packet at 202, and then the AT can send a first set of slots of a second packet at 202. When an ACK is received by the AT corresponding to successful decoding of the first set of slots of the first packet by the AN at 206, the AT can send a first set of slots of a third packet at 210. When a NAK is received by the AT corresponding to unsuccessful decoding of the first set of slots of the first packet by the AN at 206, the AT can send a second set of slots of the first packet at 208.

Furthermore, when an ACK, corresponding to successful decoding of the first set of slots of the second packet by the AN (not shown), is received by the AT, the AT can either send (a) a first set of slots of a fourth packet provided that the first set of slots of the first packet was also successfully decoded, or (b) the first set of slots of the third packet provided that the first set of slots of the first packet was unsuccessfully decoded. The AT can then gate off.

When a NAK is received by the AT corresponding to unsuccessful decoding of the first set of slots of the second packet by the AN (not shown), the AT can send the second set of slots of the second packet.

The process can be continued similarly for other sets of slots.

Additionally, the AT can sequentially send the first set of slots of the first packet, the first set of slots of the second packet, the first set of slots of the third packet (not shown), and the first set of slots of the fourth packet (not shown), at 202, before gating off. The AN can receive the first three set of slots before sending an acknowledgement signal for the first set of slots of the first packet. When an ACK is received by the AT corresponding to successful decoding of the first set of slots of the first packet by the AN at 206, the AT can send a first set of slots of a fifth packet at 210. When a NAK is received by the AT corresponding to unsuccessful decoding of the first set of slots of the first packet by the AN at 206, the AT can send the second set of slots of the first packet at 208.

Furthermore, when an ACK is received by the AT corresponding to successful decoding of the first set of slots of the second packet by the AN, the AT can send a first set of slots of a sixth packet (not shown). When a NAK is received by the AT corresponding to unsuccessful decoding of the first set of slots of the second packet by the AN, the AT can send the second set of slots of the second packet (not shown).

The process can be continued similarly for other sets of slots.

Moreover, one of ordinary skill in the art will appreciate that other combinations of sending slots by the AT and sending acknowledgment signals by the AN can be made and fall within the scope of the appended claims.

Figure 3:
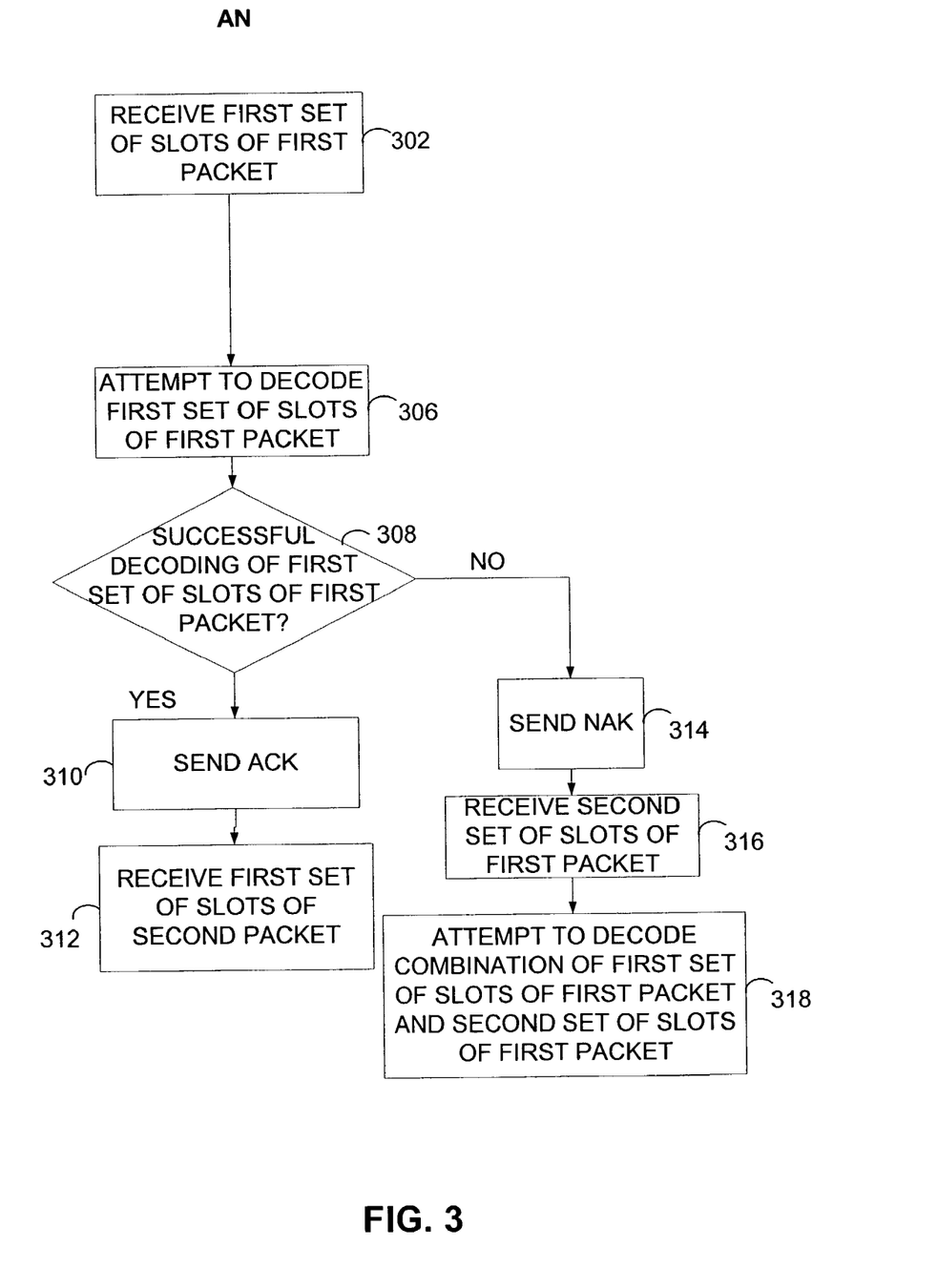
FIG. 3 illustrates a method of data transmission by the AN.

FIG. 3 illustrates a method of data transmission by the AN corresponding to the method of data transmission by the AT shown in FIG. 2.

At 302, the AN receives the first set of slots of the first packet. At 306, the AN attempts to decode the first set of slots of the first packet. Although the attempt to decode 306 is shown after the receipt of the first set of slots of the second packet, the AN can attempt to decode the first set of slots of the first packet before or after the receipt of the first set of slots of the second packet, or in parallel with the receipt of the first set of slots of the second packet.

At 308, the AN determines whether the first set of slots of the first packet has been successfully decoded. When the AN is successful in decoding the first set of slots of the first packet, the AN sends an ACK to the AT at 310, and receives the first set of slots of the second packet at 312. When the AN is unsuccessful in decoding the first set of slots of the first packet, the AN sends a NAK to the AT at 314, receives the second set of slots of the first packet at 316, and attempts to decode the combination of the first set of slots of the first packet and the second set of slots of the first packet at 318.

The preceding example is for a packet that is divided into two sets of eight slots. One of ordinary skill in the art will appreciate that a packet can be divided into more than two halves as described with reference to FIG. 2.

The timing of the sending of the ACK or the NAK can be independent of the number of sets of slots received. The AN can send the ACK or the NAK at a time after decoding a corresponding received set or sets of slots, for example, at 308, and before the AT needs the acknowledgement signal to make the determination to send a particular set of slots at 206. The timing of the sending of the ACK or the NAK can be independent of the interleaving of the sets of slots.

Figure 4:
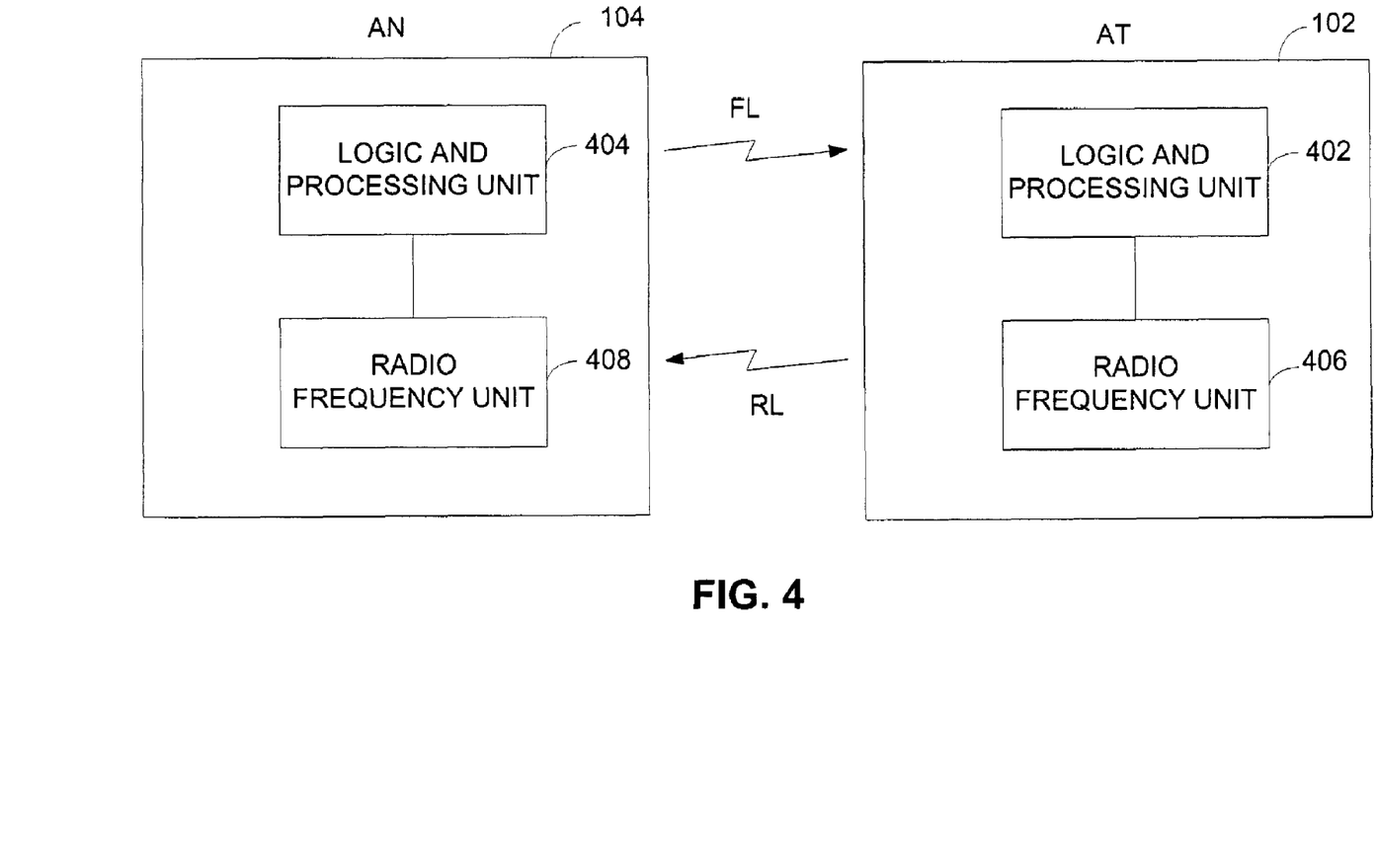
FIG. 4 illustrates a block diagram of an AT and an AN in a wireless communication system.

FIG. 4 illustrates a block diagram of an AT 102 and an AN 104 in wireless communication system. Conventional hardware and software techniques can be employed by the AT and the AN. Both the AT and the AN can comprise a logic and processing unit 402 or 404, respectively, and a radio frequency unit 406 and 408, respectively, for carrying out the above-described functionality. For example, one of ordinary skill in the art will appreciate that the radio frequency units can send and receive signals between the AN and AT, and that the logic and processing units can perform the logical operations and processing of signals.

Although the foregoing description was made with specific reference to the 1xEV-DO communication system, the reverse link automatic repeat request can also be utilized in other CDMA systems.

The previous description of the disclosed embodiments is provided to enable a person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of sending data in a wireless communication system, comprising:
    sending, by an Access Terminal, a first set of slots of a first packet to an Access Network, the first set of slots being a subset of a plurality of slots of the first packet and including a configurable number of slots;
    gating off, by the Access Terminal, for a predetermined period of time after sending the first set of slots of the first packet and before sending a next set of slots, the predetermined period of time being determined by the number of slots in the first set of slots of the first packet;
    determining, by the Access Terminal, the next set of slots to send based on whether an ACK or a NAK corresponding to successful or unsuccessful decoding, respectively, of the first set of slots of the first packet has been received from the Access Network; and
    sending, by the Access Terminal, the next set of slots after the predetermined period of time.

2. The method of claim 1, wherein said sending, by the Access Terminal, the next set of slots comprises
    sending, by the Access Terminal, a second set of slots of the first packet if the NAK has been received, and
    sending, by the Access Terminal, a first set of slots of a second packet if the ACK has been received.

3. A method of receiving data in a wireless communication system, comprising:
    receiving, by an Access Network a first set of slots of a first packet from an Access Terminal, the first set of slots being a subset of a plurality of slots of the first packet and including a configurable number of slots;
    attempting, by the Access Network, to decode the received first set of slots of the first packet;
    determining, by the Access Network, whether the received first set of slots of the first packet has been successfully decoded;
    sending, by the Access Network, an ACK or a NAK to the Access Terminal to indicate successful or unsuccessful decoding, respectively, of the received first set of slots of the first packet; and
    receiving a next set of slots from the Access Terminal a predetermined period of time after receiving the first set of slots of the first packet, the predetermined period of time being determined by the number of slots in the received first set of slots of the first packet.

4. The method of claim 3, wherein said receiving the next set of slots comprises:
    receiving a first set of slots of a second packet if the Access Network sent an ACK in response to successful decoding of the received first set of slots of the first packet; and
    receiving a second set of slots of the first packet if the Access Network sent a NAK in response to unsuccessful decoding of the received first set of slots of the first packet.

5. A method of sending data in a wireless communication system, comprising:
    sending, by an Access Terminal, at least two sets of slots of at least two packets, each set of slots of a packet being a subset of a plurality of slots of the packet;
    gating off, by the Access Terminal, for a predetermined period of time after sending the at least two sets of slots of the at least two packets to the Access Network and before sending a next set of slots, the predetermined period of time being determined by total number of slots in the at least two sets of slots of the at least two packets;
    determining, by the Access Terminal, the next set of slots to send based on whether an ACK or a NAK has been received from the Access Network for each of the at least two sets of slots of the at least two packets; and
    sending, by the Access Terminal, the next set of slots after the predetermined period of time.

6. A method of receiving data in a wireless communication system, comprising:
    receiving, by an Access Network, at least two sets of slots of at least two packets from an Access Terminal, each set of slots of a packet being a subset of a plurality of slots of the packet;
    attempting, by the Access Network, to decode each received set of slots of a packet;

determining, by the Access Network, whether each received set of slots of a packet has been successfully decoded;

sending, by the Access Network, an ACK or a NAK to the Access Terminal for each received set of slots of a packet; and receiving a next set of slots from the Access Terminal a predetermined period of time after receiving the at least two sets of slots of the at least two packets, the predetermined period of time being determined by total number of slots in the at least two sets of slots of the at least two packets.

7. The method of claim 6, wherein the receiving the next set of slots comprises receiving a set of slots of a new packet if the Access Network is successful in decoding each of the at least two sets of slots of the at least two packets, and receiving a next set of slots of one of the at least two packets if the Access Network is unsuccessful in decoding all of the at least two sets of slots of the at least two packets.

8. A method of sending data in a wireless communication system, comprising:

sending, by an Access Terminal, a first set of slots of a first packet to an Access Network, the first set of slots being a subset of a plurality of slots of the first packet and including a configurable number of slots;

gating off, by the Access Terminal, for a predetermined period of time after sending the first set of slots of the first packet to the Access Network and before sending a next set of slots, the predetermined period of time being determined by the number of slots in the first set of slots of the first packet;

receiving, by the Access Network, the first set of slots of the first packet;

attempting, by the Access Network, to decode the received first set of slots of the first packet;

determining, by the Access Network, whether the received first set of slots of the first packet has been successfully decoded;

sending, by the Access Network, a NAK to the Access Terminal if the Access Network is unsuccessful in decoding the received first set of slots of the first packet;

determining, by the Access Terminal, whether the Access Terminal has received the NAK from the Access Network; and if the NAK has been received by the Access Terminal,
sending, by the Access Terminal, a second set of slots of the first packet,
receiving, by the Access Network, the second set of slots of the first packet from the Access Terminal, and
attempting, by the Access Network, to decode a combination of the received first set of slots of the first packet and the received second set of slots of the first packet.

9. The method of claim 8 further comprising:

sending, by the Access Network, an ACK to the Access Terminal if the Access Network is successful in decoding the received first set of slots of the first packet;

determining, by the Access Terminal, whether the Access Terminal has received the ACK from the Access Network; and if the ACK has been received by the Access Terminal,
sending, by the Access Terminal, a first set of slots of a second packet.

10. The method of claim 8, wherein the NAK is sent by the Access Network on a forward link ACK channel, and wherein the NAK is sent in a phase orthogonal to the phase of a reverse link power control bit sent on a reverse power link control channel.

11. An Access Terminal comprising:
a radio frequency unit configured to,
send a first set of slots of a first packet to an Access Network, the first set of slots being a subset of a plurality of slots of the first packet and including a configurable number of slots,
gate off for a predetermined period of time after sending the first set of slots of a first packet and before sending a next set of slots, the predetermined period of time being determined by the number of slots in the first set of slots of the first packet, and
receive an ACK or a NAK; and
a logic and processing unit configured to,
determine whether the ACK or the NAK has been received; and
wherein the radio frequency unit is further configured to,
send a first set of slots of a second packet if the ACK has been received, and
send a second set of slots of the first packet if the NAK has been received.

12. An Access Network comprising:
a radio frequency unit configured to,
receive a first set of slots of a first packet from an Access Terminal, the first set of slots being a subset of a plurality of slots of the first packet and including a configurable number of slots; and
a logic and processing unit configured to,
attempt to decode the received first set of slots of the first packet, and
determine whether the received first set of slots of the first packet has been successfully decoded, and
wherein the radio frequency unit is further configured to,
send an ACK if the logic and processing unit is successful in decoding the received first set of slots of the first packet,
send a NAK if the Logic and processing unit is unsuccessful in decoding the received first set of slots of the first packet, and
receive a next set of slots from the Access Terminal a predetermined period of time after receiving the first set of slots of the first packet, the predetermined period of time being determined by the number of slots in the received first set of slots of the first packet.

13. The Access Network of claim 12, wherein:
the radio frequency unit is further configured to,
receive a second set of slots of the first packet as the next set of slots; and
the logic and processing unit is further configured to,
attempt to decode a combination of the received first set of slots of the first packet and the received second set of slots of the first packet.

14. The Access Network of claim 12, wherein the radio frequency unit is further configured to send the ACK or the NAK on a forward link ACK channel, and wherein the ACK or the NAK is sent in a phase orthogonal to the phase of a reverse link power control channel.

15. An apparatus for sending data in a wireless communication system, comprising:

means for sending a first set of slots of a first packet, the first set of slots being a subset of a plurality of slots of the first packet and including a configurable number of slots;

means for gating off for a predetermined period of time after sending the first set of slots of the first packet and before sending a next set of slots, the predetermined period of time being determined by the number of slots in the first set of slots of the first packet;

means for determining the next set of slots to send based on whether an ACK or a NAK corresponding to successful decoding or unsuccessful decoding, respectively, of the first set of slots of the first packet has been received; and means for sending the next set of slots after the predetermined period of time.

16. The apparatus of claim 15, wherein the means for sending the next set of slots comprises means for sending a second set of slots of the first packet if the NAK has been received, and means for sending a first set of slots of a second packet if the ACK has been received.

17. An apparatus for receiving data in a wireless communication system, comprising:

means for receiving a first set of slots of a first packet, the first set of slots being a subset of a plurality of slots of the first packet and including a configurable number of slots;

means for attempting to decode the received first set of slots of the first packet;

means for determining whether the received first set of slots of the first packet has been successfully decoded;

means for sending an ACK or a NAK to indicate successful or unsuccessful decoding, respectively, of the received first set of slots of the first packet; and means for receiving a next set of slots a predetermined period of time after receiving the first set of slots of the first packet, the predetermined period of time being determined by the number of slots in the received first set of slots of the first packet.

18. A method of sending data in a wireless communication system, comprising:

sending at least one set of slots of at least one packet, each set of slots of a packet being a subset of a plurality of slots of the packet and including a configurable number of slots;

gating off for a predetermined period of time after sending the at least one set of slots of the at least one packet, the predetermined period of time being determined by total number of slots in the at least one set of slots of the at least one packet;

determining a next set of slots to send based on whether an ACK or a NAK has been received for each of the at least one set of slots of the at least one packet; and sending the next set of slots after the predetermined period of time.

19. The method of claim 18, wherein said sending the at least one set of slots of the at least one packet comprises sending the at least one set of slots of the at least one packet in a portion of a first frame of a predetermined duration, wherein said gating off for the predetermined period of time comprises gating off for remainder of the first frame, and wherein said sending the next set of slots comprises sending the next set of slots in a portion of a second frame following the first frame.

20. The method of claim 18, wherein each set of slots of a packet includes one half, one fourth, one eighth, or one sixteenth of the plurality of slots of the packet.

21. The method of claim 18, wherein each set of slots of a packet includes one slot, two slots, four slots, or eight slots of the packet.

22. The method of claim 18, further comprising:

receiving the ACK or the NAK for each of the at least one set of slots of the at least one packet on a forward link ACK channel multiplexed with a reverse link power control (RPC) channel.

23. A method of receiving data in a wireless communication system, comprising:

receiving at least one set of slots of at least one packet, each set of slots of a packet being a subset of a plurality of slots of the packet and including a configurable number of slots;

attempting to decode each of the at least one set of slots of the at least one packet;

sending an ACK or a NAK for each set of slots of a packet to indicate successful or unsuccessful decoding, respectively, of the set of slots of the packet; and receiving a next set of slots a predetermined period of time after receiving the at least one set of slots of the at least one packet, the predetermined period of time being determined by total number of slots in the at least one set of slots of the at least one packet.

24. The method of claim 23, further comprising:

receiving a next set of slots of a packet unsuccessfully decoded among the at least one packet; and attempting to decode a combination of all received sets of slots of the packet unsuccessfully decoded.

* * * * *